Figure 1:
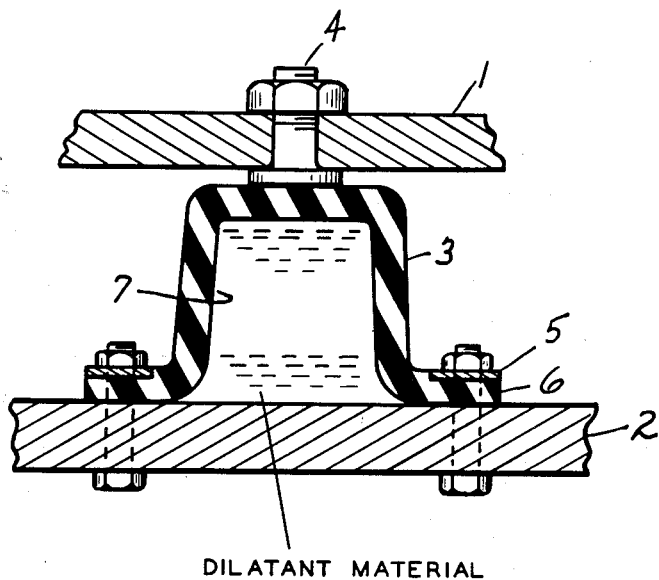

United States Patent Office 2,756,016
Patented July 24, 1956

2,756,016

SHOCK ISOLATOR

Giles Warren Painter, Erie, Pa., assignor to Lord Manufacturing Company, Erie, Pa., a corporation of Pennsylvania Application December 1, 1952, Serial No. 323,347

1 Claim. (Cl. 248—358)

This invention is intended to isolate shock by a dilatant material which offers little resistance to slowly applied forces but which stiffens and fractures under suddenly applied or shock forces. Upon fracture the energy is dissipated in heat and is not stored in a form available for rebound as is the case with springs.

In the drawing, the figure is a section through a shock isolating mounting.

In the single figure of the drawing, 1 and 2 diagrammatically indicate supporting and supported members, one of which is to be protected from shock or suddenly applied forces which may originate either in the other member or externally. Between the members there is a resilient mounting which comprises cup-shaped body 3 of rubber or similar elastomer. The body 3 is provided with an attaching bolt bonded thereto for connection to the supported member 1 and also with an attaching ring 5 bonded to the outwardly flaring rim 6 of the body for attachment to the supporting member 2. When the attaching member 5 is bolted to the member 2, the ring 6 is pressed into sealing engagement with the adjacent surface of the rim and the interior of the cup-shaped body 3 is completely enclosed and defines a cavity 7.

If the cavity 7 were empty the rubber body 3 would provide a resilient vibration isolating connection between the supporting and supported members. While this connection is satisfactory for isolating vibration originating in either of the members, it is not satisfactory for isolating shock. Under suddenly applied shock, the forces may be many times the gravity weight of the supported member 1 and the body 3 will deflect and the shock force will be stored therein and returned in the nature of a rebound which may be more damaging than the shock force.

By filling the cavity 7 with a dilatant material, that is a material which offers little resistance to gradually applied forces but which rapidly stiffens under suddenly applied forces, the mounting will offer effective isolation to shock forces without interfering with the vibration isolating properties. Under shock loads the dilatant material fractures or shatters. The shattering prevents the storage of the shock forces so that the rebound is almost negligible. The energy which would be stored in an elastic body such as the rubber 3 cannot be stored in the dilatant material but is dissipated in the form of heat. Once the shock force is removed, the dilatant material knits together and returns to its initial form in a matter of seconds.

The confining envelope provided by the cavity 7 in the body 3 determines the form of the dilatant material. Without the envelope the dilatant material would not return to any particular shape or form.

There are many materials which exhibit the property of dilatancy and can be used to fill the cavity 7 or other retaining envelopes. One such material is the silicone putty known as bouncing putty and described in Patent 2,541,851. The bouncing putty comprises a solid gel-like heat reaction product of a dimethyl silicone oil with a minor portion of a compound of boron added thereto and is characterized by having pronounced bouncing properties similar to elastic rubber and also having putty-like plasticity. The bouncing properties are exhibited under suddenly applied loads while the putty-like plasticity is exhibited under steady state or slowly applied loads. In absorbing the shock, the putty within the cavity 7 initially undergoes elastic deformation and then fractures. Since the putty is essentially incompressible it is necessary for the walls of the cavity to stretch or for the cavity to expand in volume in absorbing the shock force. This means that some of the shock force is stored in the rubber body 3. However, the greater part of the shock force is dissipated in the fracturing of the bouncing putty within the cavity 7. The energy required to fracture the putty does not go into stored elastic energy.

The properties of the putty are subject to modification depending upon the proportions and the process of manufacture. However, the property of dilatancy is exhibited to a greater or lesser extent in substantially all of the silicone bouncing putties. In any event, a dilatant silicone bouncing putty is well known and commercially available. The characteristics of the bouncing putty can be modified by additives. By adding dimethyl silicone oil to the putty, the putty becomes more stretchy or rubber-like and the rupturing properties are depressed. However, upon adding fibers such as paper, glass, or cotton the putty is again stiffened and strengthened so that it will fracture rather than stretch or elongate. The fracturing or dilatant properties of the silicone putty disappear at extreme low or extreme high temperatures. There is, however, a substantial temperature range (e. g. 35° F. to 95° F.) in which the commercially available bouncing putties exhibit usable dilatant properties insofar as shock absorption is concerned.

There are many other substances which exhibit the property of dilatancy. Dilatancy is frequently encountered in paints, printing inks, paper coating dispersions, but in these materials dilatancy is disadvantageous. Dilatancy is also exhibited by wet sea sand and by starch solutions. One of the most strikingly dilatant materials is a water dispersion of calcium carbonate a dispersing agent (sodium phosphate glass i. e. Calgon) and a metal salt such as zinc nitrate, sodium aluminate, potassium titanium oxalate, lead acetate, and barium chloride. The water dispersion is made in the form of a slurry in which the calcium carbonate solids constitute the major portion. While the calcium carbonate dispersions are markedly dilatant, the dispersions are not sufficiently stable to be attractive for general use. Upon evaporation of the water, the dilatancy disappears and does not reappear when the evaporated water is replaced. Apparently upon evaporation some chemical change takes place which destroys the dilatancy. Furthermore the dilatancy of the water dispersions has a tendency to disappear under repeated shock loads so that the performance deteriorates with use. These however are limitations upon the practical application of the shock isolating mounting and are not factors which detract from the utility in applications where these limitations are not present.

Further discussion of dilatancy appears in volume 25, page 482, Journal of Chemical Education, to which reference may be made for other dilatant materials.

What is claimed as new is:

In a combined shock and vibration isolating mounting comprising supporting and supported members, a resilient mounting structure having a flexible hollow envelope with walls of rubber-like material in load carrying relation between the members, said mounting deflecting under the weight of the supporting member and providing a vibration isolating connection reducing the transmission of periodic vibrations, the combination of a dilatant material confined within the envelope freely flowable to conform to the deflection of the walls of the envelope under gravity load and forces incident to periodic vibrations whereby the vibration isolation properties of the mounting are primarily due to the stiffness of the mounting structure and not to the dilatant material, and said dilatant material further having the property of stiffening under suddenly applied forces incident to shock and of fracturing when the shock forces are substantially greater than the forces present during periodic vibration whereby the force transmitted by shock is primarily limited to the force required to fracture the dilatant material and not by the stiffness of the mounting structure.

References Cited in the file of this patent

UNITED STATES PATENTS

| | | |
|---|---|---|
| 2,354,017 | Hazell | July 18, 1944 |
| 2,541,851 | Wright | Feb. 13, 1951 |
| 2,571,281 | Neher | Oct. 16, 1951 |
| 2,609,201 | Martin | Sept. 2, 1952 |

OTHER REFERENCES

"Silicone Putty," Product Engineering, page 90, January 1950.

General Electric Review, pages 60, 61, January 1945.

Product Engineering, pages 304–306, April 1946.

Journal of Chemical Education, pages 486–487, September 1948.